US006981147B1

(12) United States Patent
Hamann et al.

(10) Patent No.: US 6,981,147 B1
(45) Date of Patent: Dec. 27, 2005

(54) CERTIFICATION OF MULTIPLE KEYS WITH NEW BASE AND SUPPLEMENTARY CERTIFICATE TYPES

(75) Inventors: Ernst-Michael Hamann, Boeblingen (DE); Jutta Kreyss, Stuttgart (DE); Narayanan Vasudevan, Gaithersburg, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/483,358

(22) Filed: Jan. 14, 2000

(30) Foreign Application Priority Data

Jan. 29, 1999 (EP) ................................ 99101957

(51) Int. Cl.[7] ............................................. H04L 9/00
(52) U.S. Cl. ..................... 713/175; 713/150; 713/156; 713/155; 713/157; 713/173
(58) Field of Search ............................... 713/150, 156, 713/155, 157, 175, 173

(56) References Cited

U.S. PATENT DOCUMENTS

| | | | |
|---|---|---|---|
| 5,606,617 A | | 2/1997 | Brands |
| 5,659,616 A | | 8/1997 | Sudia |
| 5,717,759 A | | 2/1998 | Micali |
| 5,721,781 A | * | 2/1998 | Deo et al. .................... 705/67 |
| 5,841,865 A | * | 11/1998 | Sudia .......................... 380/286 |
| 5,924,094 A | * | 7/1999 | Sutter .......................... 707/10 |
| 6,002,768 A | * | 12/1999 | Albanese et al. ............ 713/175 |
| 6,108,788 A | * | 8/2000 | Moses et al. ................ 713/201 |
| 6,134,658 A | * | 10/2000 | Multerer et al. ............. 713/175 |
| 6,336,186 B1 | * | 1/2002 | Dyksterhouse et al. ..... 713/156 |
| 6,401,203 B1 | * | 6/2002 | Eigeles ........................ 713/156 |
| 6,490,367 B1 | * | 12/2002 | Carlsson et al. ............. 382/137 |

FOREIGN PATENT DOCUMENTS

| | | |
|---|---|---|
| DE | 197 02 049 C1 | 7/1998 |
| EP | 869 637 A2 | 10/1998 |
| WO | WO 98/02968 A2 | 1/1998 |

OTHER PUBLICATIONS

VeriSign; 'Certification Practice Statement'; May 30, 1997; VeriSign; version 1.2; sections 1-13.*
Stallings, William; Cryptography and Network Security; Jun. 4, 1998; Prentice-Hall, Inc.; 2nd Edition; pp. 323-353.*

(Continued)

Primary Examiner—Gilberto Barron, Jr.
Assistant Examiner—Jung Woo Kim
(74) Attorney, Agent, or Firm—Louis Herzberg (57) ABSTRACT

A method for creating, storing and reading a new certificate type for certification of keys is provided. In the new certificate type, several certificates, containing a minimum quantity of redundant data fields, are collated to form one certificate and all redundant information on the certificates is eliminated. An embodiment of the new certificate type is the group certificate. The group certificate is used where several keys are to be issued at the same time for the same user by the same certification instance. By means of the group certificate, all redundant data elements are eliminated and all data elements for a set of several keys subject to certification are grouped into one certificate. This substantially reduces the memory requirement, and handling of the certificates is simplified for the communication partners. A further embodiment of the new certificate type is the basic and supplementary certificate combination. This form of certification is used where certificates are issued at different times for the same user by the same certification body. The memory requirement is consequently somewhat more than for group certificates, but greater flexibility is gained in use of the keys.

20 Claims, 8 Drawing Sheets

OTHER PUBLICATIONS

Karlton, Phil; 'Proposal to add Attribute Certificate to TLS 3.1'; Jul. 26, 1996; W3; pp. 1-2.* java.sun.com; 'X.509 Certificates and Certificate Revocation Lists'; May 20, 1998; Sun Microsystems; pp. 1-5.*

Kapidzic et al.; 'A Certificate Management System: Structure, Functions and Protocols'; 1995; IEEE; pp. 153-160.*

Ellison, Carl; 'Generalized Certificates'; Sep. 12, 1996; www.clark.net.*

Rubia et al.; 'Interoperability between the X.509 and EDIFACT Public Key Infrastructures: the DEDICA Project'; Dec. 1998; Siggroup Bulletin vol. 19, No. 3; pp. 53-56.*

Silberschatz et al.; Database System Concepts; Mar. 1, 2004; Mcgraw-Hill College; 3$^{rd}$ Edition; Chapter 1 and 2.*

* cited by examiner

CERTIFICATION OF MULTIPLE KEYS WITH NEW BASE AND SUPPLEMENTARY CERTIFICATE TYPES

RELATED PATENT APPLICATIONS

U.S. patent application Ser. No. 09/109,578 filed on Jul. 2, 1998 and entitled "Inter Operability of Key Distribution Services", the contents of which application is hereby incorporated by reference.

U.S. patent application Ser. No. 09/274,525, filed on Mar. 23, 1999 and entitled "Secure Hash-And-Sign Signatures", the contents of which application is hereby incorporated by reference.

FIELD OF THE INVENTION

The present invention relates to a method for creating a new certificate, the storage of that certificate on storage media (in particular on chipcards) and the reading of the certificate.

BACKGROUND OF THE INVENTION

The idea underlying the use of the new certificate is the one-time, centralized authentication of a user or a service by an institution created for that purpose, termed a certification body. If the requirements of the certification body for successful identity verification are met, the certification body appends its own electronic signature to the public key of the identified person or service. The advantage for the subscribers to a public network lies in the fact that they only need to trust the signature of the certification body, and in this way can be sure of the authenticity of the presented public key.

The certificate consists of two parts. The first part, for example, contains data elements relating to the key, the issuer of the certificate, the user, the signature algorithm, the serial number, etc. The second part of the certificate contains a digital signature generated using the first part of the certificate. A digital signature basically establishes the authenticity of electronically transmitted messages or electronic documents. In the process of generating a digital signature a HASH algorithm is used to form a HASH value from the first part of the certificate. The HASH algorithm compresses the data of the first part of the certificate. The HASH value is decrypted with a crypto algorithm. Decryption is based on the private key of a key pair.

A series of cryptographic keys are issued to a person or an institution for various purposes. These purposes include secure network communication, e.g.

digital signature with legal recognition
  encryption of a document key
  verification of a user of an application based on a digital signature.

The possibilities for use of a key are defined in a single certificate which is digitally signed by the certification body.

At present, each digital key issued to a person or institution must be assigned a certificate. The certificates enable communication partners to verify the legitimate use of a key.

Figures 1, 2:
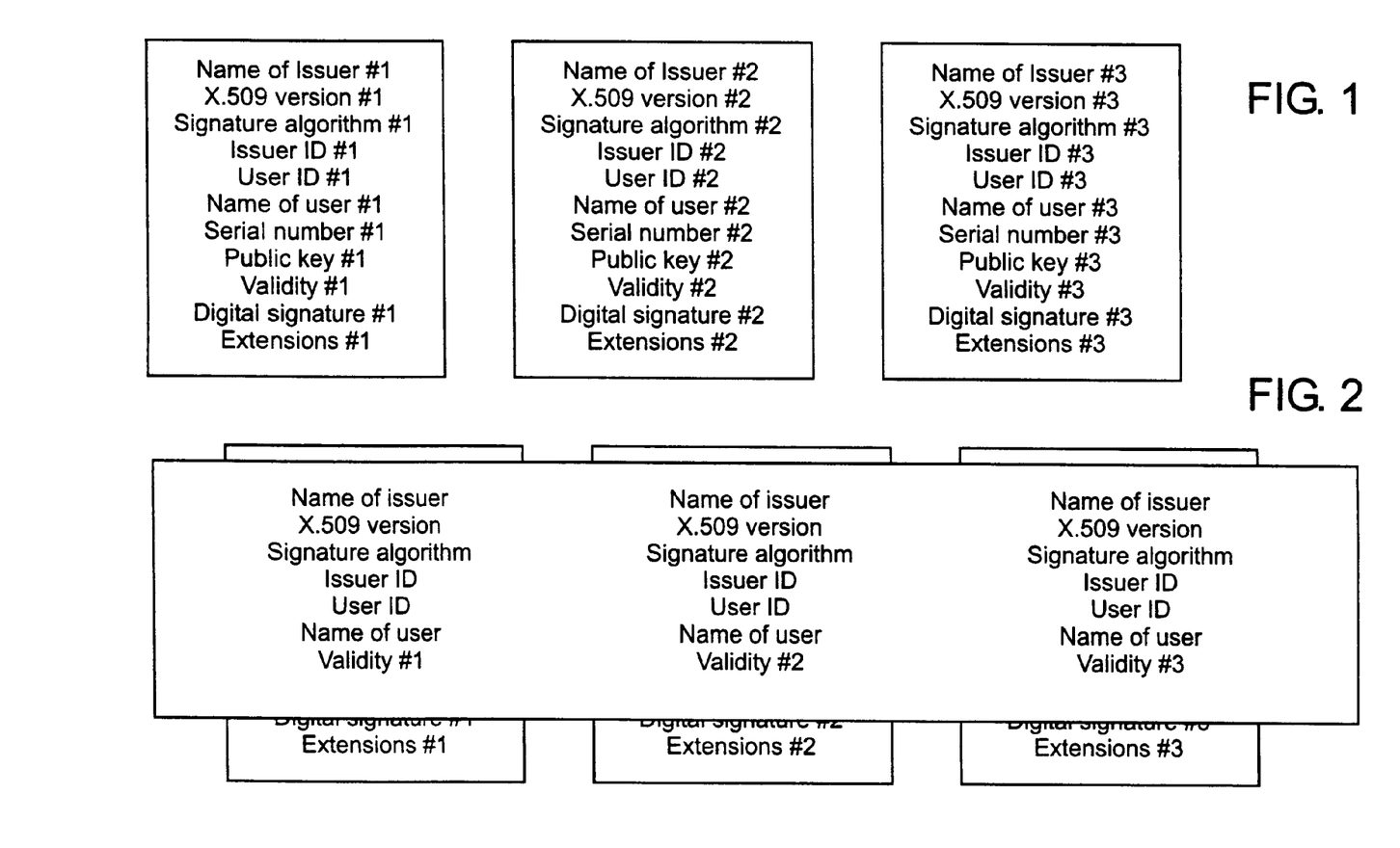
FIG. 1 shows the conventional certification of keys according to the state of the art.
FIG. 2 shows the fundamental principle of the invention based on the certification as shown in FIG. 1.

Each such certificate requires approximately 800 to 4000 bytes of data, including the certification body's digital signature. If, for example, three keys are to be stored on one chipcard in certified form, 2400 to 12000 bytes of space are required for the certificates. FIG. 1 shows the conventional storage of keys on a chipcard. For each key (1–3) a certificate is issued and stored on the chipcard. It is not possible to issue more than one key by means of one certificate and store it on the chipcard.

The issue of individual certificates for each key used means more memory is required on the keyholder's storage media. Furthermore, each certificate must be transmitted to the various communication partners of the keyholder and stored by them on their systems. The certificates also need to be stored on the various X.500 servers in the network and within the certification body in publicly accessible certificate lists. Which data fields may be redundant in several certificates is shown in FIG. 2.

The fact that one certificate is required per key results in an increased communication demand per transaction and increased memory requirement at all the communication partners. When the certificate expires, applications are made for new separate certificates for all keys, and the certificates are issued by the certification body.

It is therefore the object of the present invention to deliver a new form of the certificate which can be transmitted fast to the various communication partners and results in reduced memory requirement on the storage media.

BRIEF DESCRIPTION OF THE INVENTION

In accordance with the present invention, a new certificate type is provided. With the new certificate type, several certificates, containing a minimum quantity of redundant data fields, are collated to form one certificate and all redundant information on the certificates is eliminated. An embodiment of the new certificate type is the group certificate. The group certificate is particularly suitable where several keys are to be issued at the same time for the same user by the same certification instance. By means of the group certificate, all redundant data elements are eliminated and all data elements for a set of several keys subject to certification are grouped into one certificate. This substantially reduces the memory requirement, and handling of the certificates is simplified for the communication partners. A further embodiment of the new certificate type is the basic and supplementary certificate combination. This form of certification is suitable where certificates are issued at different times for the same user by the same certification body. The memory requirement is consequently somewhat more than for group certificates, but greater flexibility is gained in use of the keys.

BRIEF DESCRIPTION OF THE DRAWINGS

The present invention is described in more detail on the basis of preferred embodiments in conjunction with drawings, wherein.

DETAILED DESCRIPTION OF THE INVENTION

FIG. 1 presents the conventional certification of keys. A certificate is issued for each key. The certificate consists of two parts. The first part contains information (data elements) relating to the certification body (issuer of the certificate), the user of the certificate and the certified keys. These data elements include information relating to the key, the issuer of the certificate, the user, the signature algorithm, the serial number, etc. The second part contains a digital signature relating to the first part of the certificate. Table 1 describes the possible components of the first part of a certificate based on an example.

TABLE 1

| Component | Byte | Description |
| --- | --- | --- |
| 1 | 0 | Bit 7: 0 = private key |
|   |   | 1 = Public key |
|   |   | Bit 6-0: Key identification |
| 2 | 1 | Algorithm identification |
| 3 | 2 | Hash algorithm identification |
| 4 | 3 | Padding algorithm identification |
| 5 | 4 | Use of byte 0 |
| 6 | 5 | Use of byte 1 |
| 7 | 7 | Nominal key length in bits |
| 8 | 9 | Length of a data block |
| 9 | 10 | Length of a signature |
| 10 | 11 | Length of user information |
| 11 | 12 | User information |
| 12 | 13 | Length of key data |
| 13 | 15 | Key data |

Component 1 of the certificate indicates whether the cryptographic key being certified is a public or private key. Component 1 of the first part of the certificate also contains a key identification. It specifies permitted applications of the cryptographic key contained in the certificate. If, after successful certification, the cryptographic key is to be used to execute a specific application, a request is made for this key identification and a check is made as to whether the certified key is usable for the specific application. Depending on the result of this request, the cryptographic key can then either be used or an error message is generated.

With the aid of the following components 2, 3 and 4, algorithm identifications are specified. Component 2 indicates the asymmetric cryptographic methods for which the key being certified is suitable. In use of the certified key, a hash algorithm and/or a padding algorithm can be used, for example. This is defined with the aid of components 3 and 4.

With the aid of components 5 and 6 application areas of the cryptographic key can be defined. For example, component 5 can be used to determine that the cryptographic key may be used only to generate electronic signatures. Component 7 gives an indication in bits of the length of the cryptographic key to be certified with the certificate. With the aid of components 8, 9 and 10 block length data are transmitted as information for a user of the cryptographic key.

Component 11 delivers text information on the cryptographic key. This may, in particular, be instructions for use or security instructions for the user. Component 12 indicates the actual length of the cryptographic key to be certified. The key data are located in component 13.

When the first part of the certificate has been generated based on table 1, the process continues with creation of the second part of the certificate as presented in FIG. 1. To this end, an electronic signature of the first part of the certificate is generated. An electronic signature basically establishes the authenticity of electronically transmitted messages or electronic documents.

FIG. 2 shows the basic principle of the present invention. Several certificates, containing a minimum quantity of redundant information (data fields), are collated to form one certificate. The data fields framed in FIG. 2 mark the redundant data fields in the certificates being issued. In the present example the data fields: name of issuer, X.509 version, signature algorithm, issuer ID, user I/D, user name and validity of the key are identical. The only differences are the respective certificate keys.

Figures 3, 4:
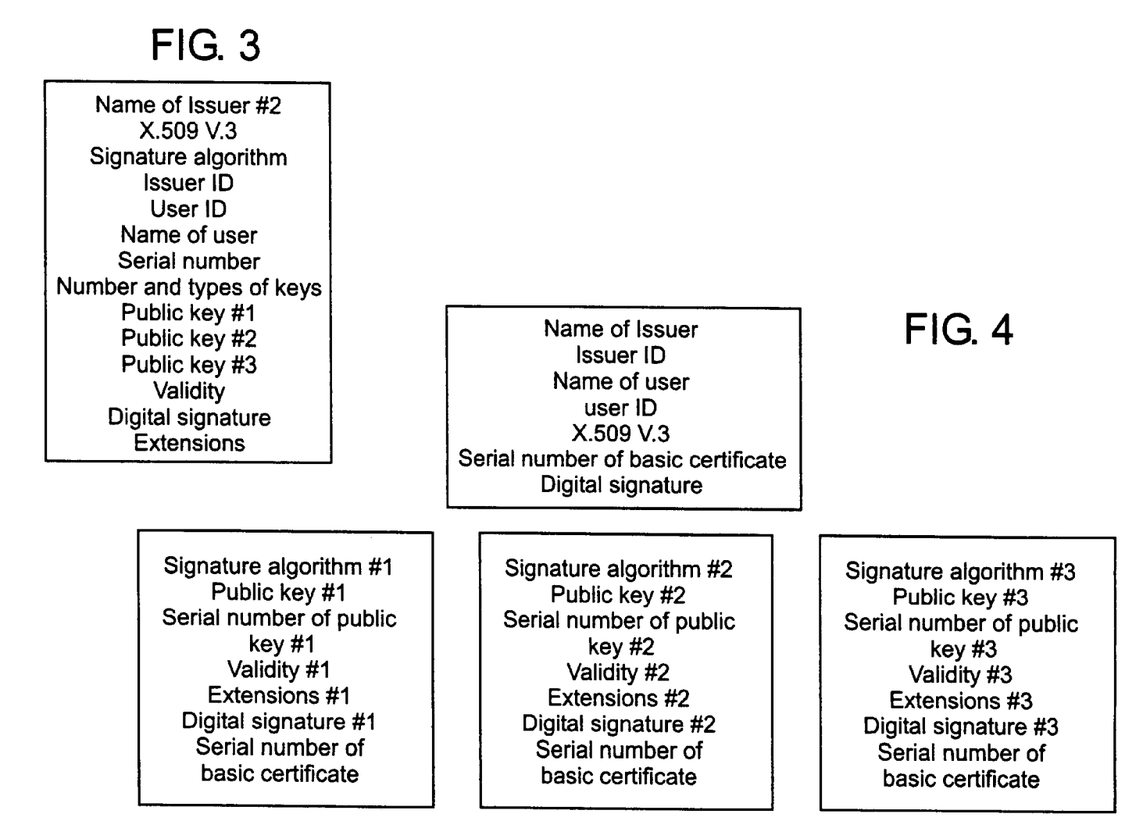
FIG. 3 shows the group certificates for the keys in accordance with the invention according to FIG. 1.
FIG. 4 shows the structure of the basic and supplementary certificates in accordance with the invention.

In this case the certificate keys 1–3 with the above-cited identical data fields are collated in one certificate where several keys are to be certified at the same time for the same user by the same certification body. FIG. 3 shows the result of this collation of identical and differing data fields (group certificate). This so-called group certificate is usually only issued where several keys are issued at the same time by the same certification body for the same user with identical validity periods. This is illustrated by the following example.

A legal entity applies for simultaneous issue of a certificate for several keys. After verification of the person a certificate (group certificate) is issued for all private keys for which application has been made. This certificate includes all keys and is signed by the certification body. All keys have a uniform period of validity. In comparison with a X.509 V 3 certificate (state of the art), only the additional information concerning the number of keys needs to be incorporated. This group certificate thus has the following data fields:

Name of issuer
Issuer ID
Name of user
User ID
Type/version of certificate
Number and types of keys
Public key
Serial number of the public key
Validity
Extensions
Digital signature of the certification body If the same user applies for keys at different times from the same certification body, the method in accordance with the invention is executed such that the certification body issues to the user a basic certificate for all keys and a supplementary certificate for each key. The basic certificate contains all redundant data fields and the supplementary certificate all differing data fields. This is illustrated by the following example in conjunction with FIG. 4.

A user applies for a single certificate. The certification body issues a basic and a supplementary certificate to the user. The basic certificate contains the following data fields:

Name of issuer (certification body)
Issuer ID
Name of user
User ID
Type/version of the certificates
Serial number of the basic certificate
Digital signature of the basic certificate from the certification body The supplementary certificate contains the following data fields:
Signature algorithm
Public key
Serial number of the public key
Validity
Extensions
Serial number of the associated basic certificate
Digital signature of the supplementary certificate from the certification body If the same user applies for an additional key, only an additional supplementary certificate is created for the key.

Figure 5:
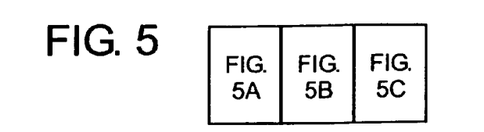
FIG. 5 shows the method of creating the group, basic and supplementary certificates in accordance with the invention.
Figure 5A:
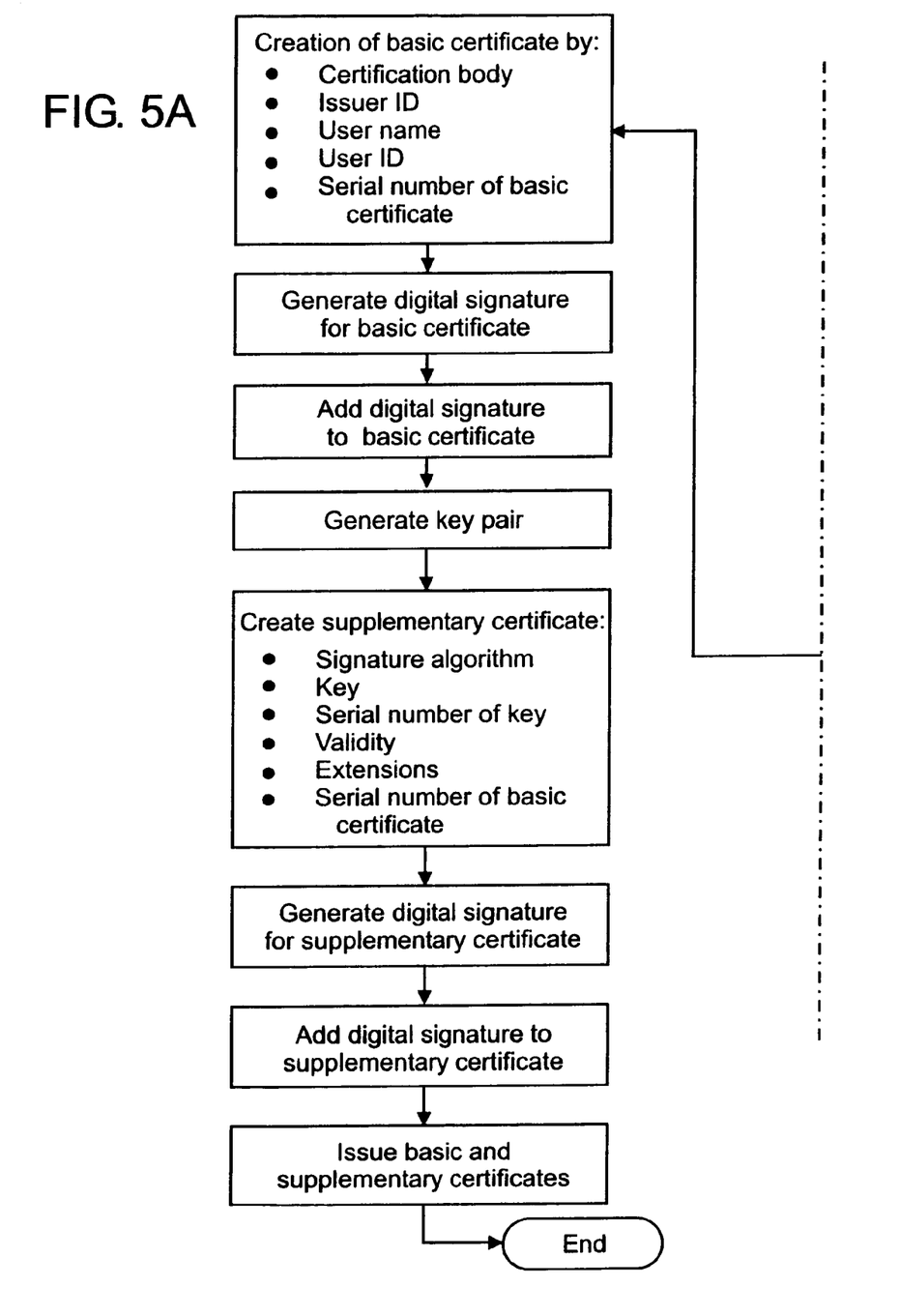
Figure 5B:
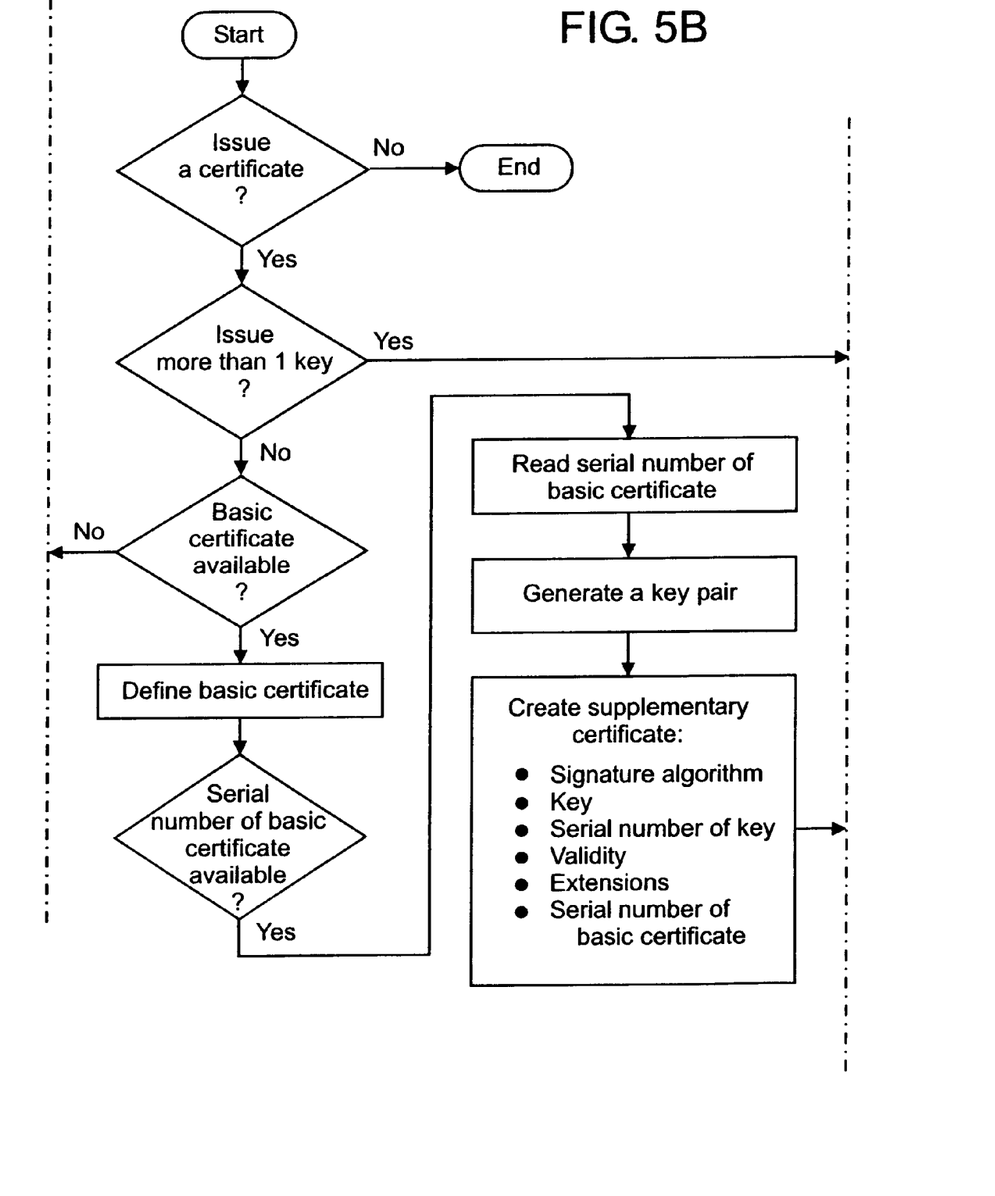
Figure 5C:
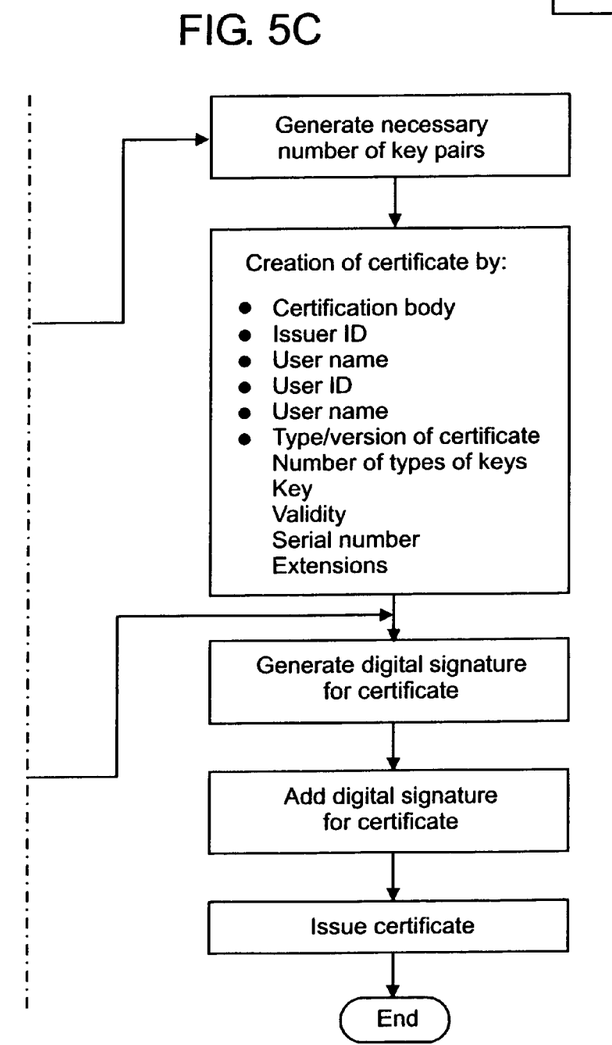

FIG. 5 shows the method of creating a certificate in accordance with the invention in the form of a flowchart.

1. The following information is provided for the preferentially menu-guided method:
   How many keys are to be certified
   Information on the user, e.g. user name, user ID
      Information on the certifying body, e.g. name of certification body, user ID of certification body
2. Based on the information obtained in step 1), the method checks whether more than one key is to be certified at one time.
3. If the check in step 2) reveals that more than one key is to be certified at one time, the appropriate number of key pair are created.
4. When the key pairs have been created in step 3), a joint certificate (group certificate) is created to certify the keys. The certificate preferentially contains the following data fields:
   Name of certification body
   User ID of certification body
   Name of user
   User ID of user
   Type/version of the certificate
   Number and types of keys
   Key
   Validity
   Serial number
   Extensions
5. Then a digital signature for the certificate is created. The details of this method are presented in the section relating to FIG. 1.
6. The digital signature is appended to the certificate.
7. The certificate with the digital signature is transmitted to the desired storage medium, which may be a chipcard. On the chipcard the certificate with the digital signature is stored in the chipcard's non-volatile memory (EPROM).
8. However, if the check in step 2) reveals that at present only one key is to be certified, the method checks whether a basic certificate is already available.
9. If a basic certificate is already available, it is loaded and the serial number of the basic certificate—if available—is read to the system RAM.
10. A key pair (public/private key) is created.
11. A supplementary certificate preferentially containing the following data fields is created:
    Signature algorithm
    Key
    Serial number of key
    Validity period of the certificate
    Extensions
    Serial number of the basic certificate
12. Then the method of digital signature is executed for the supplementary certificate as described in step 5) and the digital signature is appended to the supplementary certificate.
13. If step 9 reveals that no basic certificate is available, the in method accordance with the invention first creates a basic certificate with the following data fields:
    Name of certification body
    User ID of certification body
    Name of user
    User ID of user
    Serial number of the basic certificate
14. Then a digital signature for the basic certificate is created and appended to the basic certificate.
15. Then a key pair is created.
16. Then a supplementary certificate with the following data fields is created:
    Signature algorithm
    Key
    Serial number of key
    Validity period of the certificate
    Extensions
    Serial number of the basic certificate
17. A digital signature for the supplementary certificate is created and appended to the supplementary certificate.

Figure 6:
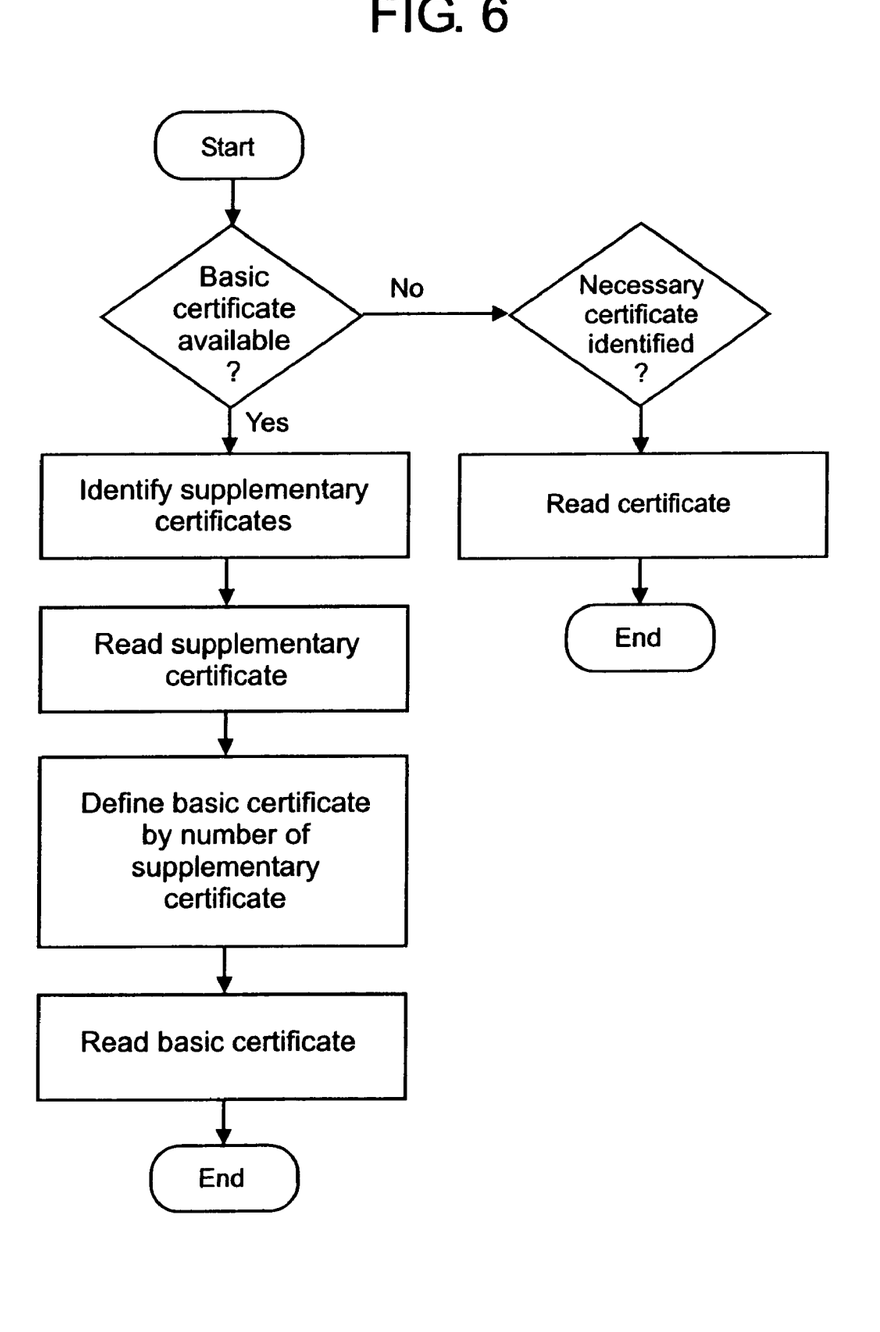
FIG. 6 shows the method of reading the group, basic and supplementary certificates in accordance with the invention.

FIG. 6 describes the method in accordance with the invention for reading the certificate created in FIG. 5.

It is to be assumed in the following that a specific application sends a request to the chipcard asking it to sign a message. To sign the message the chipcard requires a key. As presented in FIG. 5, the relevant keys are stored in the relevant supplementary certificates on the chipcard. The method in accordance with the invention first checks whether there are basic certificates stored on the chipcard. If there are no basic certificates stored on the chipcard, this means that there are no input certificates. In such cases the requested signature key can only be stored in a group certificate. The method searches through the group certificates stored on the chipcard to locate a suitable signature key and loads the identified group certificate into the chipcard's RAM. The signature key can now be taken from the certificate and used to sign the message. If the method ascertains that there are also basic certificates stored on the chipcard, it first searches through all stored supplementary certificates for the presence of a suitable signature key for the application in question and loads the supplementary certificate with the suitable signature key into the chipcard RAM. The method reads from the supplementary certificate the serial number of the basic certificate, searches for the corresponding basic certificate and reads it too into the chipcard RAM. The chipcard RAM now contains the basic certificate and the associated supplementary certificate with the suitable signature key.

Figure 7:
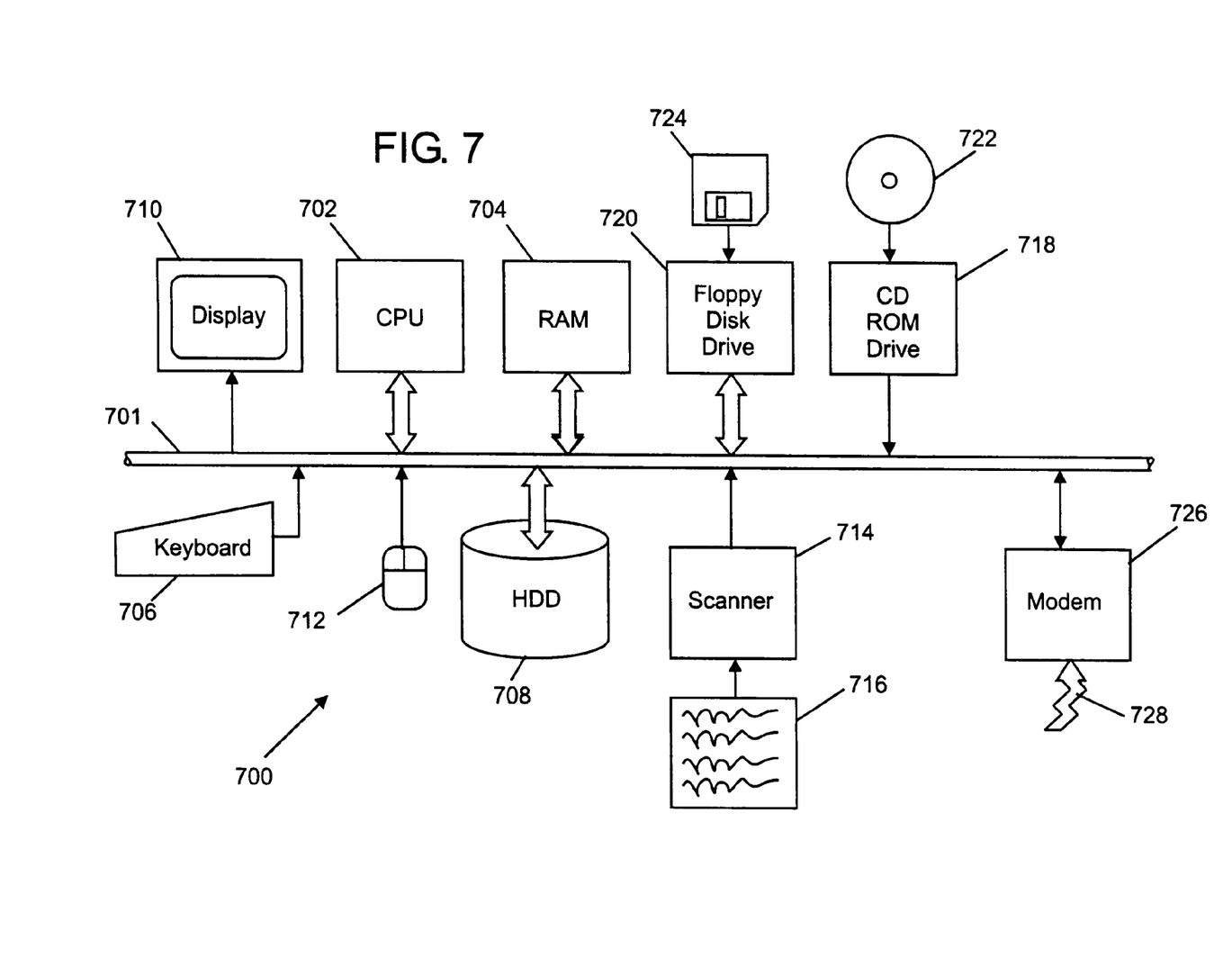
FIG. 7 is a block diagram of a computer system which the present invention is applicable.

The present invention is capable of running on any properly configured general purpose computer system, such as the one shown in FIG. 7. Such a computer system 700 includes a processing unit (CPU) 702 connected by a bus 701 to a random access memory 704, a high density storage device 708, a keyboard 706, a display 710, and a mouse 712. Also attached to the CPU 702 by the bus 701, are a scanner 714 for scanning documents 716 into the computer 700; and CD-ROM and magnetic disc drivers 718 and 720 for entry of information from optical and floppy magnetic disc mediums 722 and 724 containing the program code and data of the present invention. An example of such a computer is an IBM Personal Computer of the International Business Machines Corporation, with a 500 Mhz Pentium processor of Intel Corporation operating under Microsoft Windows 98 operating system of the Microsoft Corporation.

Figure 8:
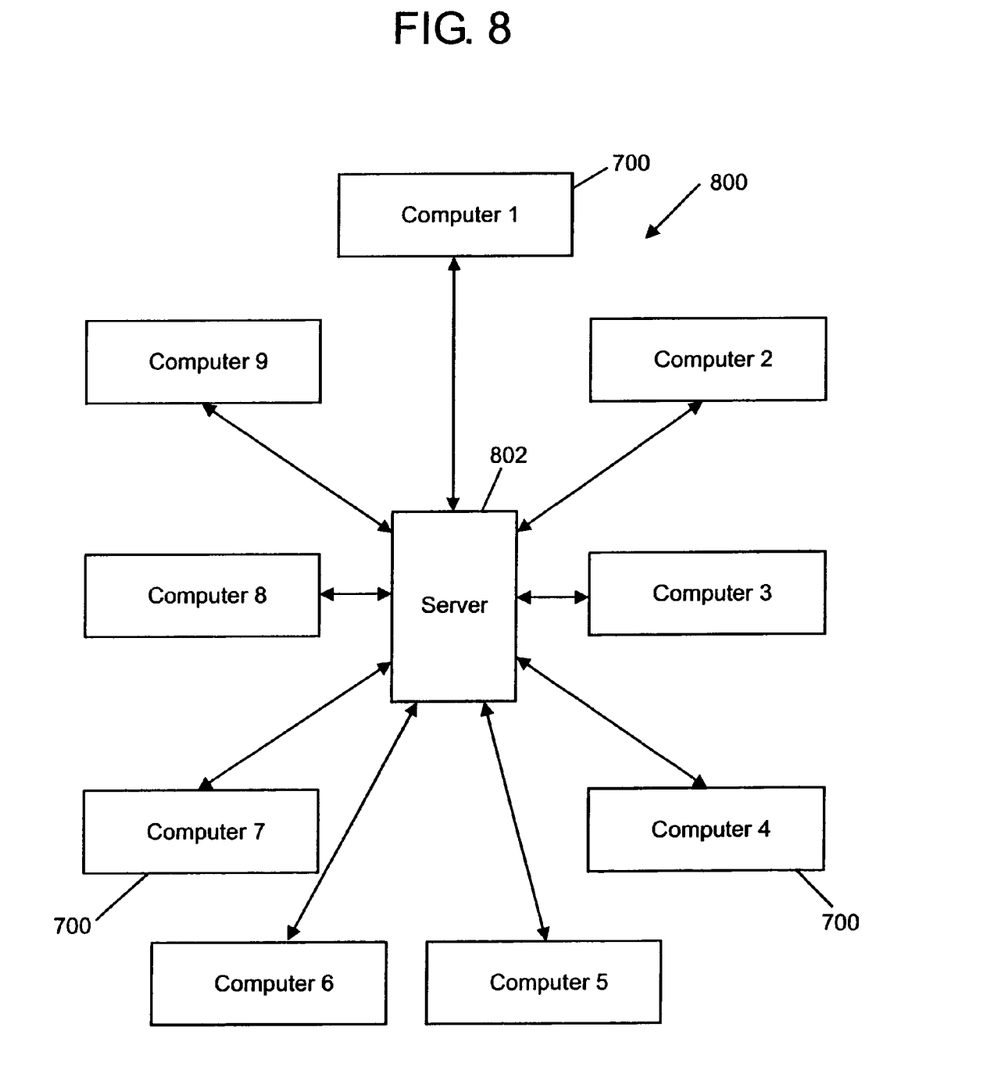
FIG. 8 is a block diagram of a network to which the present invention is applicable.

The computer 700 also contains a modem 726 for telecommunication of information 728 on the Internet and other networks. As shown in FIG. 8, computers 700, like the one described above, are connected together in a network 800 by a server 802 that can be used to exchange information and one computer can access information contained in another. The database search engine and the checking and updating software, may be permanently located on all computers of the network, or can be on one computer, say computer 7, and transmitted through the medium of electromagnetic signals from that one computer to the other computers on the network when it is to be accessed and modified.

The advantages of the present invention lie in the fact that by the creation of a group certificate, and of basic and supplementary certificates, the size of the certificates can be decisively reduced and handling of the certificates by the holders and their communication partners is simplified. The group certificates with three keys save 1200 to 10000 bytes of memory space for the certificates.

For the basic and supplementary certificates additional shorter supplementary certificates (key certificates) per key are issued in addition to the basic certificate. This means somewhat more space is taken up than by the group certificates, but greater flexibility is provided in use of the keys.

It should be clear to those skilled in the art that a number of changes can be made in what has been disclosed without departing from the invention. Therefore, it should be understood that the present invention is not limited to the disclosed embodiment but includes within its scope those embodiments encompassed by the spirit and scope of the appended claims.

What is claimed is:

1. A method of creating certificates with redundant information to certify keys of a user, wherein each of the certificates comprises a defined number of data elements which at least contain information on a certification body or issuer of the certificate, a user of the certificate and a key certified by the certificate, comprising the following steps:
   a) creation by the certification body of a basic certificate for use in connection with the several keys of the user, the basic certificate containing a single recitation of a defined number of data elements therein which elements are identical or redundant if repeated in separate certificates one for each of the several keys of the user in conjunction with the certification body;
   b) addition of an identifying characteristic to the basic certificate;
   c) generation of a digital signature for the basic certificate;
   d) addition of the digital signature to the basic certificate;
   e) generation of a key pair;
   f) creation of a supplementary certificate for the basic certificate which does not recite the redundant data elements contained in the basic certificate but does contain a key as set out in step e), the identifying characteristic as set out in step b) and additional data fields not registered by the basic certificate;
   g) generation of a digital signature for the supplementary certificate;
   h) addition of the digital signature to the supplementary certificate; and
   i) use of the basic certificate created in step a) for other of the several keys in additional supplementary certificates that share with the supplementary certifactes of step f) the redundant information recited in the basic certificate but like the supplementary certificate of step f) do not recite the redundant data elements.

2. The method in accordance with claim 1, characterized in that the basic certificate does not contain any keys but comprises the following data elements:
   name of the certification body,
   user ID of the certification body,
   name of the user,
   user ID of the user, and
   an identifying characteristic of the basic certificate.

3. The method in accordance with claim 2, characterized in that the supplementary certificates do not contain the redundant information recited in the basic certificate but comprise the following data elements:
   a signature algorithm,
   a key,
   serial number of the key,
   a validity period of the certificate,
   extensions, and
   the identifying characteristic of the basic certificate.

4. The method in accordance with claim 1 where one key is to be certified in step i) and the basic certificate of step a) already exists, including the following steps:
   aa) definition of the basic certificate and reading of the identifying characteristics of the basic certificate;
   bb) generation of a new key pair;
   cc) creation of a supplementary certificate for the basic certificate with additional data fields not registered by the basic certificate, wherein one of the keys of step bb) is inserted into the supplementary certificate in;
   dd) insertion of the identifying characteristics in accordance with step aa) into the supplementary certificate to locate the associated basic certificate;
   ee) generation of a digital signature for the supplementary certificate; and
   ff) addition of the digital signature to the supplementary certificate.

5. The method in accordance with claim 4, characterized in that any supplementary certificates each contain the following data elements:
   a signature algorithm,
   a key,
   a serial number of the key,
   validity period of the certificate,
   extensions, and
   the identifying characteristic of the basic certificate.

6. The method in accordance with claim 1, characterized in that the basic certificate and the supplementary certificates are stored in a non-volatile memory of a chipcard.

7. The method of claim 6 including the step of determining if the chipcard contians a relevant key to sign a message in the chip cards nonvolatile storage medium comprising:
   a) check of the nonvolatile storage medium for presence of basic certificates;
   b) if a basic certificate is present, identification of a supplementary certificate with a suitable signature key;
   c) reading-in of the supplementary certificate into the chipcard RAM;
   d) definition of the identification number of the basic certificate from the supplementary certificate; and e) reading-in of the basic certificate into the RAM.

8. A computer program product on a computer usable hardware medium for creating certificates to certify several keys sharing redundant information, wherein a certificate comprises a defined number of data elements which at least contain information on a certification body or issuer to the certificate, a user of the certificate and a key certified by the certificate, said computer program product comprising:
   a) software code for specification of a request for certification of one of the several keys by a certification body for a user;

b) software code for creation of a basic certificate that does not contain any key for the user but does contain a defined number of data elements which, in the certification process, are identical or redundant for the several keys of the user in conjunction with the respective certification body when initially not more than one of the several keys is to be certified with the basic certificate;

c) software code for the addition of an identifying characteristic to the basic certificate;

d) software code for the generation of a digital signature for the basic certificate;

e) software code for the addition of the digital signature to the basic certificate;

f) software code for generation of a key pair;

g) software code for creation of a supplementary certificate for the basic certificate with a key pair generated with the software as set out in f), the identifying characteristic as set out in c) and additional data elements not registered by the basic certificate of b);

h) software code for generation of a digital signature for the supplementary certificate;

i) software code for addition of the digital signature to the supplementary certificate; and j) software code for use of the basic certificate created in step b) with a new key that shares the redundant data elements with the basic certificate by issuing an additional supplementary certificate with a new key pair generated with software as set forth in f), the identifying certificate as set forth in c) and additional data elements not registered by the basic certificate of b) or the supplementary certificate of g).

9. The computer program product in accordance with claim 8, characterized in that the basic certificate comprises the following data elements:
  name of the certification body,
  user ID of the certification body,
  name of the user,
  user ID of the user, and
  identifying characteristic of the basic certificate.

10. The computer program product in accordance with claim 8, characterized in that the supplementary certificates comprise the following data elements:
  a signature algorithm,
  a public key from the key pair of f) or a public key from the new key pair of j),
  a serial number of the key,
  a validity period of the certificate,
  extensions, and
  identifying characteristic of the basic certificate.

11. The computer program product in accordance with claim 8, where more than one key with the same validity period is to be certified at one time, including the following software code:
  aa) software code for generation of several key pairs;
  bb) software code for generation of a single group certificate for the more than one key with all data elements necessary for the individual keys and keys generated in step aa), omitting the redundant data elements for the several keys by having only a single recitation of the redundent data elements in the group certificate;
  cc) software code for generation of a digital signature for the group certificate; and
  dd) software code for addition of the digital signature to the group certificate.

12. The computer program product software in accordance with claim 11, characterized in that the group certificate contains the following data elements:
  name of the certification body,
  user ID of the certification body,
  name of the user,
  user ID of the user,
  type or version of the certificate,
  number and types of keys,
  a key,
  a validity period of the certificate
  serial Number, and
  extensions.

13. The computer program product in accordance with claim 8, where a key is to be certified and the basic certificate already exists, including the following software code:
  aa) software code definition of the basic certificate and reading of the identifying characteristics of the basic certificate;
  bb) software code for generation of a key pair;
  cc) software code for creation of a supplementary certificate for the basic certificate with additional data fields not registered by the basic certificate, wherein one of the keys is inserted into the supplementary certificate by step bb);
  dd) software code for insertion of the identifying characteristics in accordance with step aa) into the supplementary certificate to locate the associated basic certificate;
  ee) software code for generation of a digital signature for the supplementary certificate; and
  ff) software code for addition of the digital signature to the supplementary certificate.

14. The computer program product in accordance with claim 13, characterized in that the supplementary certificate contains the following data elements:
  a signature algorithm,
  a key,
  serial number of the key,
  validity period of the supplementary certificate,
  extensions, and
  the identifying characteristic of the basic certificate.

15. A method of creating and using certificates to certify several keys for use in connection with a chipcard, wherein each of the certificates comprises a defined number of data elements which at least contain information on a certification body or issuer of the certificate, a user of the certificate and a key certified by the certificate, comprising the following steps:
  a) creation by the certification body of a basic certificate that does not contain a key but is for use in connection with the several keys of the user, the basic certificate containing a single recitation of a defined number of data elements therein which elements would be identical or redundant if contained in separate certificates one for each of the several keys of the user in conjunction with the certification body;
  b) addition of an identifying characteristic to the basic certificate;
  c) generation of a digital signature for the basic certificate;
  d) addition of the digital signature to the basic certificate;
  e) generation of a key pair;
  f) creation of a supplementary certificate for the basic certificate which does not recite the redundant data elements contained in the basic certificate but does contain a key as set out in step e), the identifying characteristic as set out in step b) and additional data fields not registered by the basic certificate;

g) generation of a digital signature for the supplementary certificate;

h) addition of the digital signature to the supplementary certificate;

i) use of the basic certificate created in step a) for other of the several keys in additional supplementary certificates that share with the supplementary certificate of step f) the redundant information recited the basic certificate but like the supplementary certificate of step f) do not recite the redundant data elements; and j) storage of the basic and supplementary in a nonvolatile memory of the chipcard.

16. The method in accordance with claim 15, characterized in that the basic certificate comprises the following data elements:
name of the certification body,
user ID of the certification body,
name of the user,
user ID of the user, and
an identifying characteristic of the basic certificate.

17. The method in accordance with claim 15, characterized in that the supplementary certificates comprise the following data elements:
a signature algorithm,
a key,
serial number of the key,
a validity period of the certificate,
extensions, and
the identifying characteristic of the basic certificate.

18. The method in accordance with claim 15, where more than one key with the same validity period are to be certified at one time in step f), including the following steps:

aa) generation of several key pairs one for each of the keys;

bb) generation of a single certificate for all the several keys with all data elements necessary for the individual keys and keys generated in step aa), with only a single recitation of data elements redundant to all the several keys in the group certificate;

cc) generation of a digital signature for the group certificate;

dd) addition of the digital signature to the group certificate; and ee) group certificate in the nonvolatile memory of the chipcard.

19. The method in accordance with claim 16, characterized in that the basic certificate contains the following data elements:
name of the certificate body,
user ID of the certification body,
name of the user,
user ID of the user,
type or version of the certificate,
number and types of keys,
a key,
a validity period of the certificate
serial number, and
extensions.

20. The method of claim 18 including the step of determining if the chipcard contains a relevant key in the chipcards nonvolatile storage medium to sign a message, comprising a) check of the nonvolatile storage medium for presence of basic certificates;

b) if a basic certificate is present, identification of a supplementary certificate with a suitable signature key;

c) reading-in of the supplementary certificate into a RAM of the chipcard;

d) definition of the identification number of the basic certificate from the supplementary certificate;

e) reading-in of the basic certificate into the RAM;

f) when no basic certificate is identified checking of the storage medium for presence of group certificate; and g) reading-in of a necessary group certificate into the RAM.

* * * * *